United States Patent
Ohsaki et al.

(10) Patent No.: US 7,539,816 B2
(45) Date of Patent: May 26, 2009

(54) DISK CONTROL DEVICE, DISK CONTROL METHOD

(75) Inventors: Yoshihiro Ohsaki, Kawasaki (JP); Vinh Van Nguyen, Kawasaki (JP); Mayumi Akimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 271 days.

(21) Appl. No.: 11/525,036

(22) Filed: Sep. 22, 2006

(65) Prior Publication Data

US 2007/0067562 A1 Mar. 22, 2007

(30) Foreign Application Priority Data

Sep. 22, 2005 (JP) ............................. 2005-276869
Aug. 30, 2006 (JP) ............................. 2006-234583

(51) Int. Cl.
*G06F 12/00* (2006.01)

(52) U.S. Cl. .................. 711/112; 711/100; 711/111; 711/115; 711/143; 711/154; 711/155; 711/165; 711/166; 710/1; 710/5; 710/6; 710/20; 710/33; 710/34; 710/36; 710/39; 710/40; 710/52; 710/53; 710/56; 710/57; 707/205

(58) Field of Classification Search ......... 711/111–114, 711/143, 161–163, 115, 154, 155, 165, 166; 710/52, 53, 56, 57, 1, 5–6, 20, 33–34, 36, 710/39–40; 707/205

See application file for complete search history.

(56) References Cited

U.S. PATENT DOCUMENTS

| 5,841,598 A | 11/1998 | Horiuchi et al. ............... 360/31 |
| 6,658,541 B2 | 12/2003 | Kitamura et al. ............ 711/162 |
| 6,757,782 B2* | 6/2004 | Higaki et al. ................ 711/114 |
| 6,789,163 B2* | 9/2004 | Fox et al. ..................... 711/112 |
| 7,076,604 B1* | 7/2006 | Thelin ......................... 711/112 |
| 2003/0084252 A1* | 5/2003 | Talagala ..................... 711/135 |
| 2006/0047897 A1* | 3/2006 | Thiessen et al. ............. 711/112 |

FOREIGN PATENT DOCUMENTS

| JP | 06-250792 | 9/1994 |
| JP | 8-255058 | 10/1996 |
| JP | 2002-132554 | 5/2002 |
| JP | 2002-342038 | 11/2002 |

* cited by examiner

*Primary Examiner*—Tuan V Thai
*Assistant Examiner*—Zhuo H Li
(74) *Attorney, Agent, or Firm*—Staas & Halsey LLP

(57) ABSTRACT

A disk control device stores write requests from a cache memory or reads commands from a host in a queue for a disk drive in chronological order. When the number of write requests stored in the queue for the disk drive is greater than a predetermined value, the storage location of write requests is changed to a queue for an extra disk drive, and the write requests are stored in the queue for the extra disk drive. When the number of write requests stored in the queue for the disk drive becomes smaller than a predetermined threshold, the write requests stored in the extra disk drive are written back to the disk drive.

5 Claims, 5 Drawing Sheets

DISK CONTROL DEVICE, DISK CONTROL METHOD

BACKGROUND OF THE INVENTION

1. Field of the Invention

The present invention relates to a disk control device, a disk control method that facilitate access to disk drives in response to write commands or read commands from a host.

2. Description of the Related Art

A disk control device forms a system by being connected to a host, which is an upper interface, and to a disk drive, which is a lower interface.

If write data sent from a host is increasing so that the capacity of a cache memory becomes insufficient to store new write data sent from the host, the disk control device writes the write data of the corresponding block in the cache memory into the disk drive according to the write back method, thereby reserving a sufficient area of the cache memory for storing the write data sent from the host.

While the write data is being written back to the disk drive, many write commands from the host are stored in the processing queue of the disk control device.

In this situation, upon receiving a read command, the disk control device issues to store the read command in the processing queue for the disk drive. In this case, many write commands are already stored in the processing queue for the disk drive.

Accordingly, the read command has to wait until the write commands are written. Accordingly, the performance of the reading processing (hereinafter simply referred to as the "read performance") is greatly influenced by write access processing.

Thus, the read performance during the write back processing is deteriorated compared to that when the write back processing is not performed.

SUMMARY OF THE INVENTION

Accordingly, it is an object of the present invention to provide a disk control device that improves the decreased read performance caused by increased write commands in relation to read commands during write back processing for writing back data stored in a cache memory to a disk drive.

To achieve this object, a disk control device stores write back commands from a cache memory or reads commands from a host in a queue for a disk drive in chronological order. When the number of write back commands stored in the queue for the disk drive is greater than a predetermined value, the storage location of write back commands is changed to a queue for an extra disk drive, and the write back commands are stored in the queue for the extra disk drive. When the number of write back commands stored in the queue for the disk drive becomes smaller than a predetermined threshold, the write back commands stored in the extra disk drive are written back to the disk drive.

As a result, the decreased read performance during write back processing can be improved, and thus, the stable read performance can be maintained.

DESCRIPTION OF THE PREFERRED EMBODIMENTS

The present invention is described in detail below with reference to the accompanying drawings through illustration of a preferred embodiment.

Figure 1:
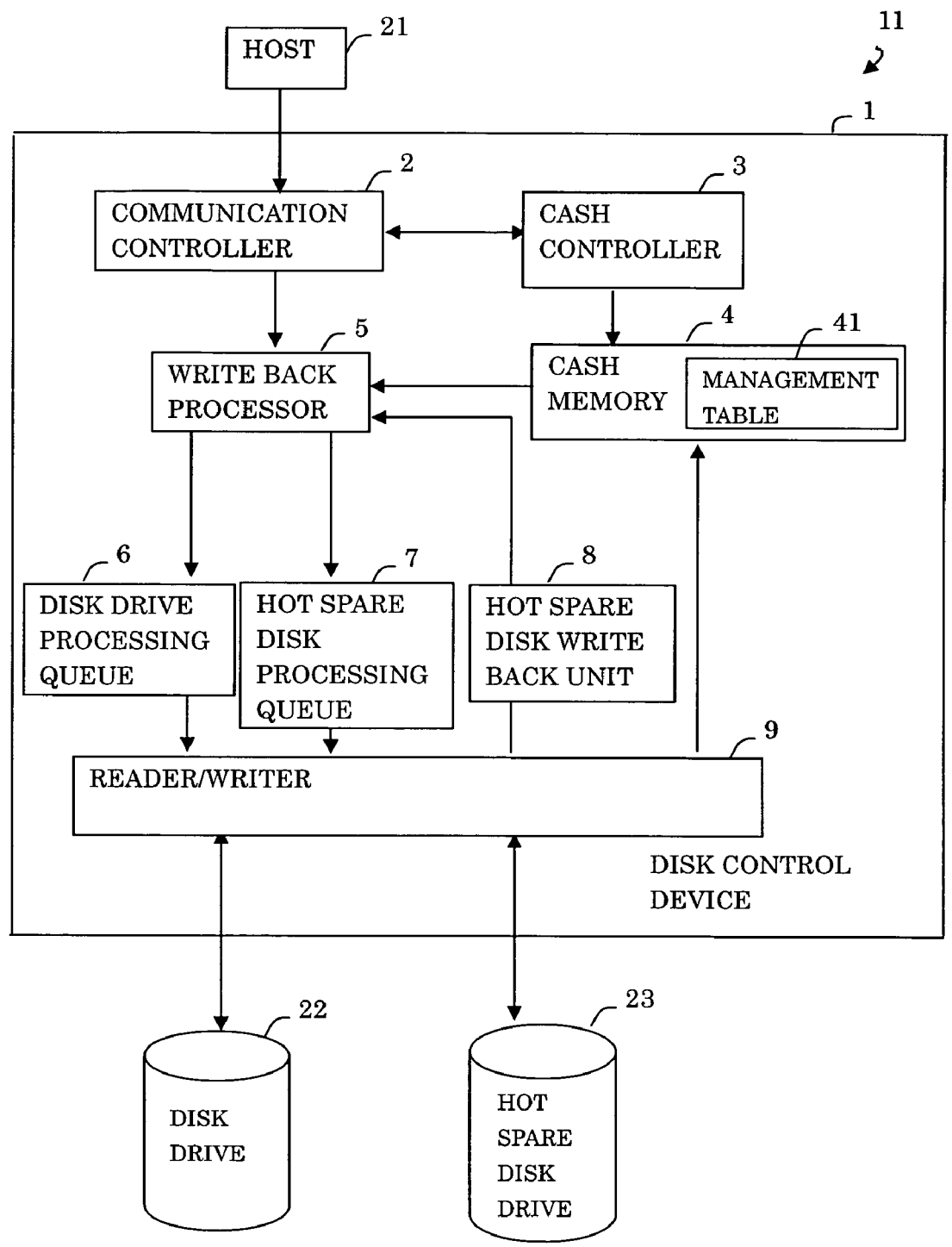
FIG. 1 is a block diagram illustrating the configuration of a disk control device according to an embodiment of the present invention.

FIG. 1 is a block diagram illustrating a disk control device according to an embodiment of the present invention.

A disk system 11 shown in FIG. 1 includes a disk control device 1, a host 21, a disk drive 22, and a hot spare disk drive 23.

The host 21 issues a read command or a write command to the disk control device 1 and waits for a response from the disk control device 1.

The disk drive 22 is installs a plurality of media thereon and is managed by being divided into a plurality of logical volumes. The disk drive 22 is accessed by the disk control device 1 to read or write data.

The hot spare disk drive 23 is a drive used for hot spare (hot standby) as an alternative to a failed disk when the disk drive 22 using the redundant array of inexpensive disks (RAID) system is rebuilt or a copy backup operation is performed. In the embodiment of the invention, the hot spare disk drive 23 is used, not only for an alternative to a failed disk, but also for an alternative disk dedicated for saving write data when performing write back processing.

The disk control device 1 includes a communication controller 2, a cache controller 3, a cache memory 4, a write back processor 5, a disk drive processing queue 6, a hot spare disk processing queue 7, a hot spare disk write back unit 8, and a reader/writer 9.

The communication controller 2 controls communication with the host 21.

In response to a command from the host 21, the cache controller 3 checks for data in the cache memory 4, i.e., whether or not data is stored in the cache memory 4 (whether a cache hit or a cache miss occurs), and issues a read request or a write request to the write back processor 5.

The write request has LBA (Logical Block Address) that shows data position on the disk drive 22 and the write request has address that shows data position on the cache memory 4. The read request has LBA that shows data position on the disk drive 22.

The host 21, the disk drive 22 and the hot spare disk drive 23 have the same LBA and the same data length corresponding to the LBA.

The cache memory 4 is an area for storing write data transferred from the host 21 or data read from the disk drive 22.

The cache memory 4 stores the table that shows the data position corresponding to the LBA, the LBA and a management table 41. The management table 41 manages the LBA corresponding to write requests to be stored in the hot spare disk processing queue 7.

The write back processor 5 controls write requests for writing back data and read requests.

The disk drive processing queue 6, which is a processing queue for the disk drive 22, stores read requests and write requests in chronological order of receiving them. Accordingly, the disk drive processing queue 6 uses a First-In First-Out (FIFO) memory.

The hot spare disk processing queue 7, which is a processing queue for the hot spare disk drive 23, stores write requests in chronological order in a FIFO memory when the disk drive processing queue 6 exceeds a threshold. The hot spare disk processing queue 7 stores read requests when the management table 41 has the LBA corresponding to the read requests.

The hot spare disk write back unit 8 performs control for writing back data from the hot spare disk drive 23 to the disk drive 22.

The reader/writer 9 controls read/write access to the disk drive 22 when the disk drive processing queue 6 has write requests or read requests. The reader/writer 9 controls read/write access to the hot spare disk drive 23 when the hot spare disk processing queue 7 has write requests or read requests.

An overview of the operation of the disk control device 1 is as follows.

When write data sent from the host 21 is increasing so that the capacity of the cache memory 4 becomes insufficient to store write data from the host 21, the disk control device 1 writes back overflowing block data in the cache memory 4 to the disk drive 22. As a result, an area for storing new write data sent from the host 21 can be reserved in the cache memory 4. To implement this operation, the cache controller 3 issues a write request to the write back processor 5.

The write request is sequentially stored the temporarily in the disk drive processing queue 6 as write requests.

Then, data corresponding to the write request at the head of the disk drive processing queue 6 is written into the disk drive 22 by the reader/writer 9.

Because of this write back operation, a space is created in the cache memory 4. Accordingly, write data sent from the host 21 is stored in the cache memory 4.

In response to a read command from the host 21, if a cache hit occurs in the cache memory 4, the hit data is read.

However, if a cache miss occurs, the cache controller 3 issues a read request to the write back processor 5. The write back processor 5 sets the read request in the disk drive processing queue 6.

During this write back processing, when the disk drive processing queue 6 exceeds a predetermined threshold of the number of write requests, write requests are stored in the hot spare disk drive processing queue 7.

That is, when the disk drive processing queue 6 exceeds the predetermined threshold, it no longer stores write requests corresponding to write commands sent from the host 21. However, in the case of a cache miss, read requests corresponding to read commands are stored in the disk drive processing queue 6 even in the excess of the threshold.

As a result, unlike known write back processing, even if there are many preceding write commands, read commands can be processed preferentially, thereby improving the decreased read performance.

The write data written into the hot spare disk drive 23 is written back to the disk drive 22 when the number of write requests stored in the disk drive processing queue 6 becomes smaller than a predetermined threshold.

Figure 2:
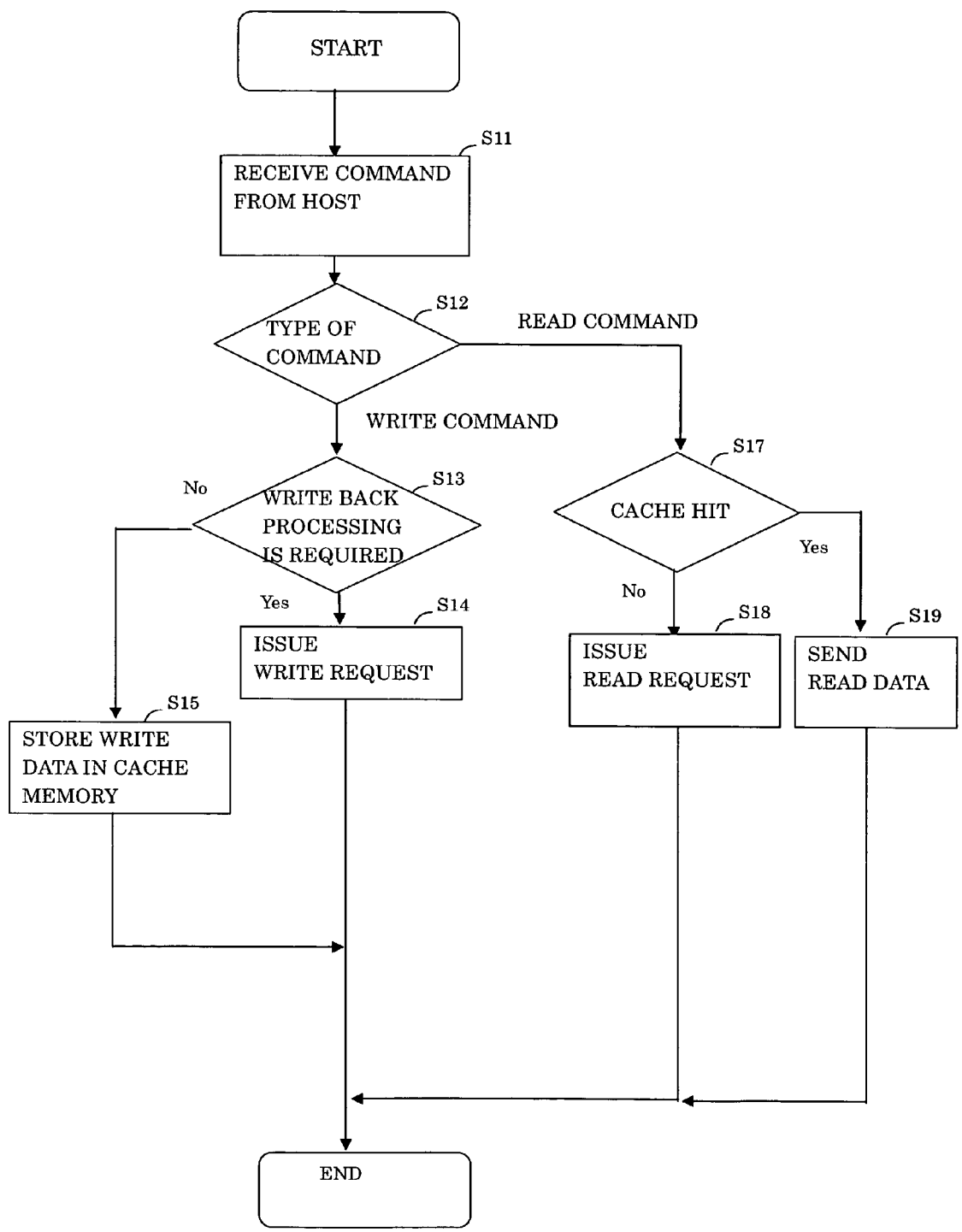
FIG. 2 is a flowchart illustrating processing performed by a cache controller according to an embodiment of the present invention.

FIG. 2 is a flowchart illustrating the processing performed by the cache controller 3.

In step S11, a command is received from the host 21.

In step S12, the type of command is checked.

If it is determined in step S12 that the command type is a write command, the process proceeds to step S13 to determine whether it is necessary to perform write back processing by checking the remaining capacity of the cache memory 4 and by checking for the block data corresponding to the write command in the cache memory 4.

If it is determined in step S13 that write back processing is required, the process proceeds to step S14 in which a write request is issued to the write back processor 5.

If it is found in step S13 that write back processing is not required, the write data is stored in the cache memory 4 in step S15.

If the command type is found to be a read command in step S12, the process proceeds to step S17 to determine whether a cache hit has occurred.

If a cache hit has not occurred, the process proceeds to step S18 in which a read request is issued to the write back processor 5.

If a cache hit has occurred, the process proceeds to step S19 in which the read data is sent to the host 21 via the communication controller 2.

Figure 3:
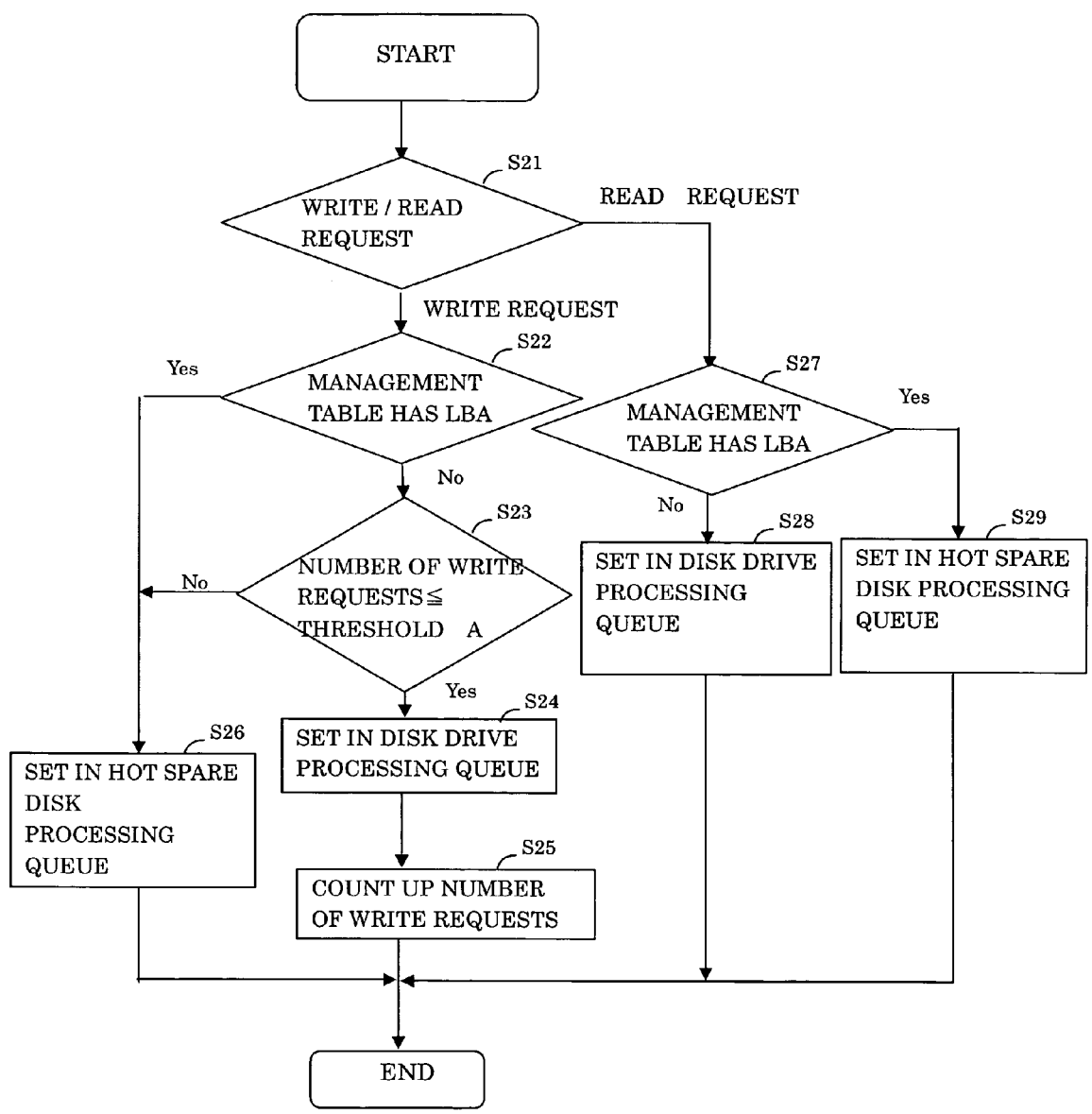
FIG. 3 is a flowchart illustrating processing performed by a write back processor according to an embodiment of the present invention.

FIG. 3 is a flowchart illustrating the processing performed by the write back processor 5.

The processing shown in FIG. 3 is executed, assuming that write back processing is performed since there is no sufficient space in the cache memory 4. In this situation, read/write access processing for accessing the disk drive 22 from the host 21 via the disk control device 1 is as follows.

In step S21, it is first determined whether a write request or a read request from the cache controller 3 or a write request for writing back data from the hot spare disk drive 23 has been received.

Then, if a write request has been received in step S21, the process proceeds to step S22 to determine whether the management table 41 has the LBA.

Then, if the management table 41 has the LBA, the process proceeds to step S26.

If the management table 41 does not have the LBA, the process proceeds to step S23 to determine whether the number of write requests in the disk drive processing queue 6 exceeds threshold A.

If the number of write requests in the disk drive processing queue 6 does not exceed threshold A, the process proceeds to step S24 in which the write request corresponding to the block data written back from the cache memory 4 is set in the disk drive processing queue 6.

Then, in step S25, the number of write requests in the disk drive processing queue 6 counts up.

If it is determined in step S23 that the number of write requests in the disk drive processing queue 6 exceeds threshold A, the process proceeds to step S26. In step S26, a write request is issued to the hot spare disk drive 23 rather than to the disk drive 22, and stores the write request in the hot spare disk processing queue 7 and stores LBA corresponding to the write request in the management table 41.

If a read request from the cache controller 3 has been received in step S21, the process proceeds to step S27 to determine whether the management table 41 has the LBA corresponding to the read request.

Then, if the management table 41 has the LBA, the process proceeds to step S28 in which the read request is set in the disk drive processing queue 6.

If the management table 41 does not have the LBA, the process proceeds to step S29 in which the read request is set in the hot spare disk processing queue 7.

As a result the read request can be set to the disk drive processing queue 6 without influence of the number of write requests.

If the management table 41 has the LBA corresponding to read request, the read request can be set to the hot spare disk drive processing queue 7.

Thus the processing of the read request can be promoted.

As discussed above, when a read command is received from the host 21 while the disk control device 1 is performing write back processing, the received read command is less influenced by the access processing for write data.

As a result, even when write back processing is performed, the read performance is not deteriorated compared to that when write back processing is not performed.

Figure 4:
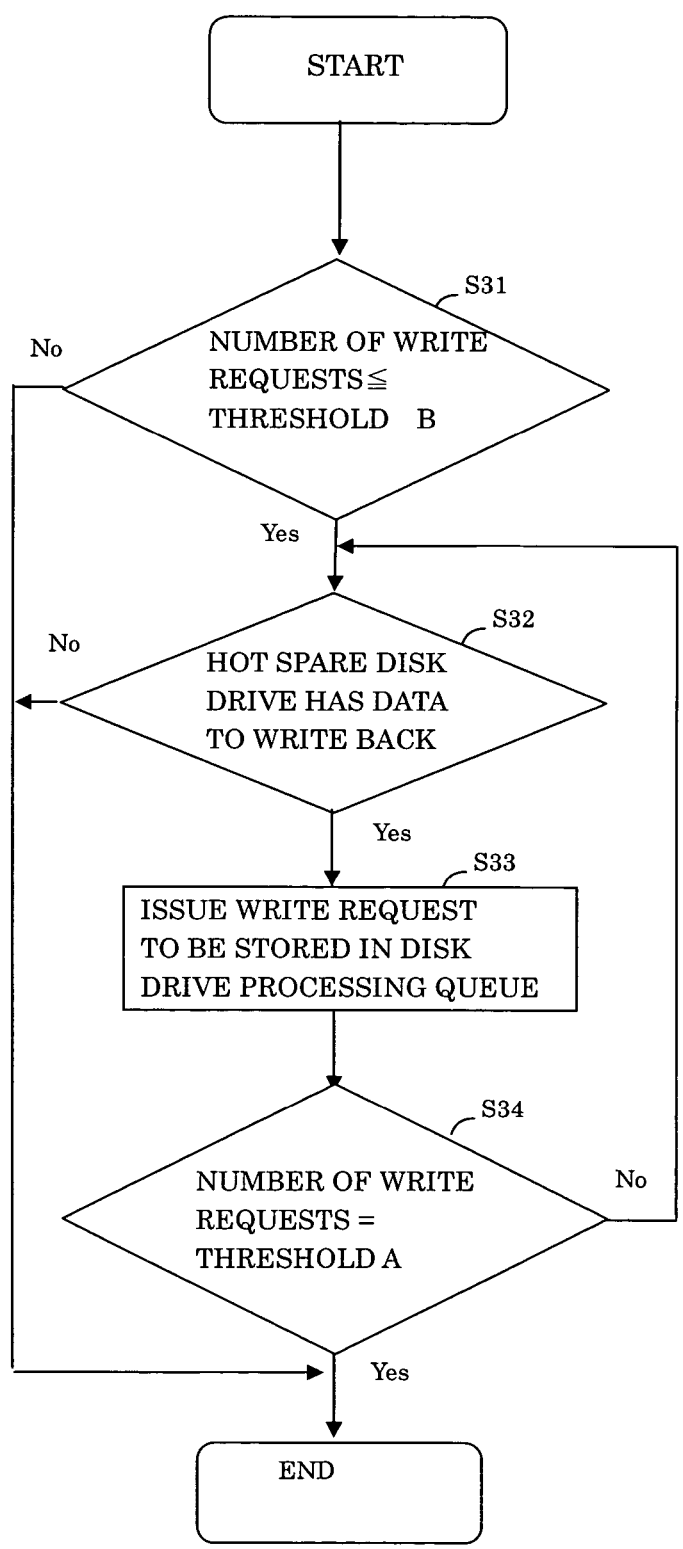
FIG. 4 is a flowchart illustrating processing performed by a hot spare disk write back unit according to an embodiment of the present invention.

FIG. 4 is a flowchart illustrating the processing performed by the hot spare disk write back unit 8.

It is first determined in step S31 whether the number of write requests in the disk drive processing queue 6 exceeds threshold B.

If the number of write requests in the disk drive processing queue 6 exceeds threshold B, the processing is completed.

If the number of write requests in the disk drive processing queue 6 does not exceed threshold B, the process proceeds to step S32 to determine whether the hot spare disk drive 23 has data to write back to the disk drive 22.

If the hot spare disk drive 23 has data to write back to the disk drive 22, the process proceeds to step S33 in which the hot spare disk write back unit 8 issues a write request to the write back processor 5 and the write request is stored in the disk drive processing queue 6 by the write back processor 5.

The hot spare disk write back unit 8 deletes the LBA corresponding to the write request from the management table 41 when a storing completion notification in the disk drive processing queue 6 is received from the write back processor 5.

Then, it is determined in step S34 whether the number of write requests to be written back from the hot spare disk drive 23 to the disk drive 22 is equal to threshold A. In this case, it is assumed that threshold B is smaller than threshold A.

If the number of write requests is equal to threshold A, the disk drive processing queue 6 can no longer receive write requests, and the processing is thus completed.

If the number of write requests is smaller than threshold A, the process returns to step S32.

The reader/writer 9 controls read/write access to the disk drive 22 when the disk drive processing queue 6 has write requests or read requests. The reader/writer 9 controls read/write access to the hot spare disk drive 23 when the hot spare disk processing queue 7 has write requests or read requests.

The reader/writer 9 sends a completion notification to the cache controller 3 via the write back processor 5 if the write processing to the disk device 22 or the hot spare disk drive 23 is completed.

The cache controller 3 writes data to the cache memory 4 when the cache controller 3 receives the completion notification.

The reader/writer 9 sends the read data to the cache controller 3 via the write back processor 5 if the read processing to the disk device 22 or the read processing to the hot spare disk drive 23 is completed.

The cache controller 3 send read data to the host 21 and writes read data to the cache memory 4.

If an area of the cache memory 4 is full, write back processing occurs.

Figure 5:
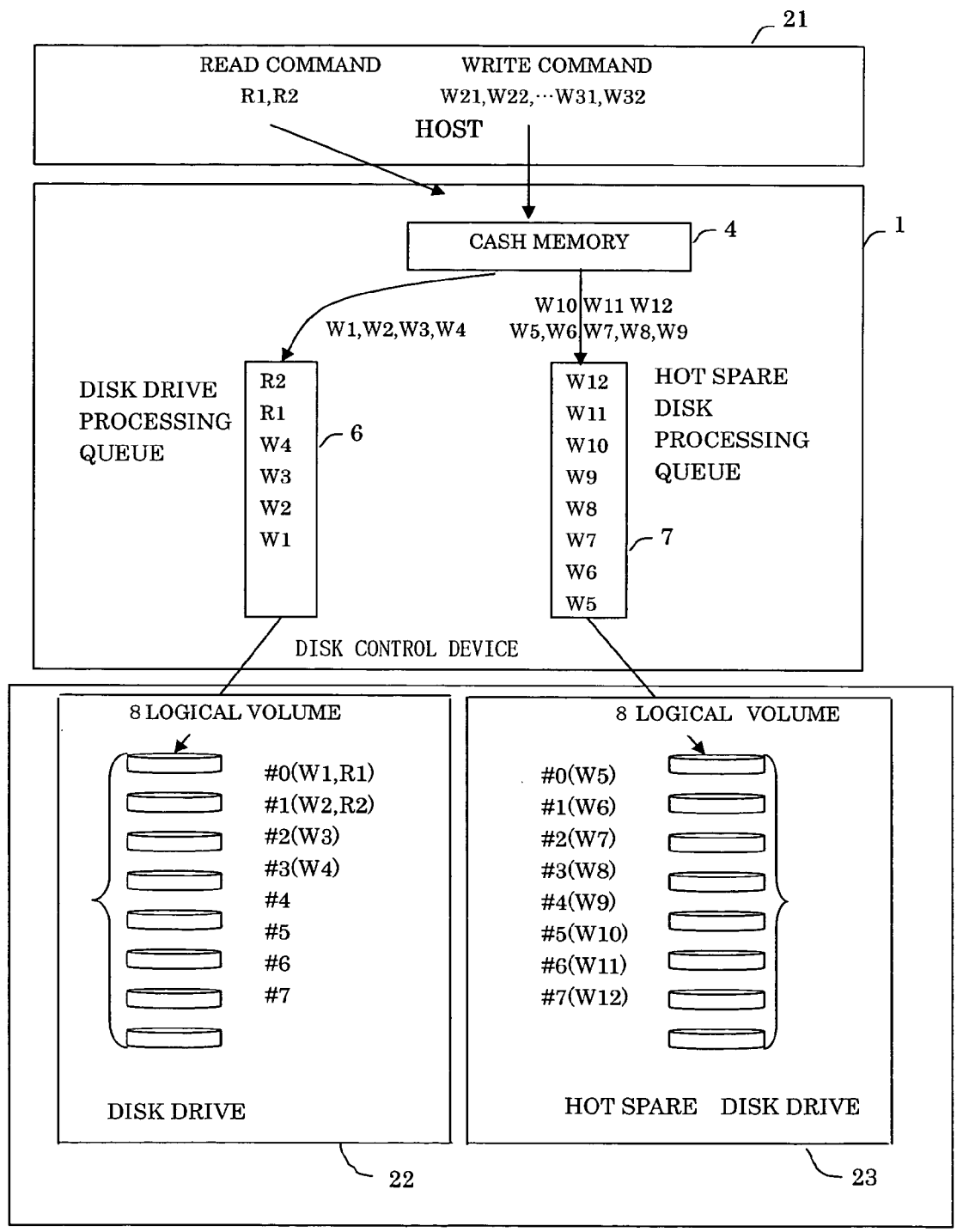
FIG. 5 is a flowchart illustrating write back processing according to an embodiment of the present invention.

At the system the reader/writer 9 does not send the completion notification to the cache controller 3 via the write back processor 5 if the write processing to the hot spare disk drive 23 is completed, read requests are stored only in the disk drive processing queue 6. FIG. 5 illustrates write back processing in this embodiment.

Write commands W21 through W32 and read commands R1 and R2 are received from the host 21. Data to be written back (write requests) in response to the write commands W21 through W32 are referred to as W1 through W12.

The order of receiving commands from the host 21 is W21 through W24, R1, W25 through W29, R2, and W30 through W32. In this example, the threshold A is set to be 4 and the management table 41 does not have the LBA corresponding to R1, R2.

It is now assumed that there is no remaining capacity of the cache memory 4 and that a cache miss occurs.

Upon receiving commands W21 through W24, write requests W1 through W4 to be written back from the cache memory 4 are stored in the disk drive processing queue 6.

While the write back processing is being performed, the read command R1 received from the host 21 is stored in the disk drive processing queue 6 as a read request R1, and the read request R1 has to wait until the processing of the write requests W1 through W4 has been finished.

Then, upon receiving the write commands W25 through W29, the corresponding write requests W5 through W9 are stored in the hot spare disk processing queue 7. The read command R2 received from the host 21 is stored in the disk drive processing queue 6 as a read request R2.

Then, upon receiving the write commands W30 through W32, the corresponding write requests W10 through W12 are stored in the hot spare disk processing queue 7.

In known write back processing without using the hot spare disk drive 23, the read request R2 stored in the disk drive processing queue 6 has to wait until the write requests W5 through W9 have been processed. In the write back processing according to this embodiment of the present invention, however, the write requests W5 through W9 are stored in the hot spare disk processing queue 7 by the anagement of the threshold of the number of write requests.

Accordingly, the read request R2 is processed immediately after the processing of the read request R1 without the need to wait for the completion of the processing of the write requests W5 through W9. This means that the read command R2 is not influenced by write commands, unlike known write back processing. As a result, the read performance during the write back processing can be improved.

Write data written in the hot spare disk drive 23 in response to the write request is written back to the disk drive 22 asynchronously with the write back processing. Then, the hot spare disk drive 23 fulfils the role in saving write data.

It is desirable that the data is written back from the hot spare disk drive 23 to the disk drive 22 when access to the disk drive 22 is not so frequent. The frequency of access to the disk drive 22 is determined by the number of write requests in the disk drive processing queue 6, and when the number of write requests in the disk drive processing queue 6 becomes smaller than threshold B, the data is written back from the hot spare disk drive 23 to the disk drive 22. By utilizing the concept of thresholds, read/write access to the disk drive 22 and the hot spare disk drive 23 can be performed with suitable frequencies.

As a result, in the write back processing for writing back data from the cache memory 4 of the disk control device 1 to the disk drive 22 since there is no space in the cache memory 4, the decreased read performance caused by increased write commands in relation to read commands stored in one processing queue, which manages read and write commands to read and write data into and from a physical disk having many logical disk volumes, can be improved.

What is claimed is:

1. A disk control device connecting a first disk drive and a second disk drive, comprising:
    a first queue storing write requests from a cache memory and read requests from a host for the first disk drive in chronological order;
    a second queue storing write requests from the cache memory for the second disk drive; and
    a controller controlling the disk control device including
        disk access means for sequentially reading requests stored in the first queue for the first disk drive to access the first disk drive,
        queue changing means for changing a storage location of write requests to the second queue when the number of write requests stored in the first queue is greater than a predetermined value,
        request-allocation means for directly storing the write requests into the second queue and for storing only the read requests into the first queue after queue changing,
        write means for writing the write requests stored in the second queue into the second disk drive, and
        writing back means for writing back the write requests stored in the second disk drive to the first disk drive when the number of write requests stored in the first queue becomes smaller than a predetermined threshold.

2. The disk control device according to claim 1, wherein the second disk drive is a hot spare disk drive.

3. The disk control device according to claim 1, wherein the controller stores the read request in the second queue for the second disk drive if the second disk drive has the data corresponding to the read request.

4. A disk control method comprising:
    a queue storing step of storing write requests from a cache memory and read requests from a host in a first queue for a first disk drive in chronological order;
    a disk access step of sequentially reading requests stored in the first queue for the first disk drive to access the first disk drive;
    a queue changing step of changing a storage location of write requests to a second queue for a second disk drive when the number of write requests stored in the queue storing step is greater than a predetermined value;
    a request-allocation step of storing the write requests into the second queue and for storing the read requests into the first queue after the queue changing step;
    a disk write step of writing the write requests stored in the second queue for the second disk drive into the second disk drive; and
    a write back step of writing back the write requests stored in the second disk drive to the first disk drive when the number of write requests stored in the queue storing step becomes smaller than a predetermined threshold.

5. A disk control method according to claim 4, further comprising a storing step of storing the read request in the second queue for the second disk drive if the second disk drive has data corresponding to the read request.

* * * * *